United States Patent [19]

Smith

[11] 4,270,986
[45] Jun. 2, 1981

[54] METHOD FOR SOLDERING ALUMINUM

[75] Inventor: Gary W. Smith, Brookpark, Ohio

[73] Assignee: Sifco Industries, Inc., Cleveland, Ohio

[21] Appl. No.: 56,832

[22] Filed: Jul. 12, 1979

[51] Int. Cl.$^3$ ............................ C25F 1/00; C25F 3/00; C25D 5/44

[52] U.S. Cl. .................................. 204/48; 204/129.1; 204/141.5; 219/85 R; 219/129

[58] Field of Search ............... 204/129.1, 48, 141.5, 204/130, 149, 129.2, 129.25, 33; 219/85 R, 129

[56] References Cited

U.S. PATENT DOCUMENTS

| 3,804,726 | 4/1974 | Passal | 204/48 X |
| 4,042,475 | 8/1977 | Bijlmer | 204/141.5 |
| 4,126,523 | 11/1978 | Wong | 204/141.5 X |

OTHER PUBLICATIONS

Morley et al., "The Repair of Aluminum Heat Exchanger", *Welding Journal*, Oct., 1978, pp. 15–22.
*Aluminum Soldering Handbook*, 3rd Edition, (1976), Aluminum Association, Inc., New York, N.Y. pp. 12–18.

*Primary Examiner*—Arthur C. Prescott
*Attorney, Agent, or Firm*—Pearne, Gordon, Sessions, McCoy & Granger

[57] ABSTRACT

A method and apparatus for soldering aluminum are disclosed. According to the method, the aluminum surface to be soldered is subject to conventional cleaning, then electrolytic cleaning and electrolytic etching, followed by electroplating a very thin layer of nickel on the cleaned and etched surface. The electrolytic cleaning, etching, and plating operations are all carried out by the use of a brush plating tool having an insulated handle portion, to one end of which a wire electrode encased in a porous covering composed of polyester felt is secured.

After the plating has been completed, the surface may be soldered with conventional soft solders and non-corrosive fluxes, using conventional soldering techniques.

9 Claims, 5 Drawing Figures

METHOD FOR SOLDERING ALUMINUM

BACKGROUND OF THE INVENTION

This invention relates to a method and apparatus for soldering aluminum, and more particularly to a method and apparatus for making solder repairs in aluminum articles, such as automobile radiators, heat exchangers, and the like, with the use of ordinary soft solder and conventional soldering techniques.

There are many services where aluminum can advantageously be employed because of its availability, metallurgical and physical characteristics, good heat exchange capacity, and light weight. A large market for aluminum exists in the field of radiators and other heat exchangers used in automotive vehicles. Acceptance of aluminum for purposes such as automobile radiators, however, depends upon the availability of simple and inexpensive techniques for repairing leaks and other damage in the radiators or the like, and it is essential that the techniques used in repair do not require the use of unusual or expensive equipment and do not require highly skilled operators or unusual working conditions.

At the present time in the United States, there are several thousand automobile radiator repair shops. The operators of these shops are accustomed to repairing copper-brass radiators by the use of conventional soft soldering techniques, but these techniques heretofore have not been successful in connection with the soldering of aluminum.

The problem is that when soft solder is used in connection with aluminum, interfacial corrosion occurs very rapidly where electrolytes are present. With usual soft soldering methods, the bond between the solder and the underlying aluminum surface has not been good enough to prevent entirely the penetration of electrolyte to the interface and corrosion occurs. Various methods have been proposed to overcome this difficulty. For example, an abrasive soldering technique has been proposed in an effort to remove all of the oxide from the aluminum surface. This requires zinc solder and hard brushing of the joint while the molten zinc solder is on the leak area. This method also requires that care be taken to avoid overheating of the parts.

Electroplating techniques have been proposed to enable the use of low melting point solders. Techniques employing two or more electrodeposited layers have been used. One such method consists in first electroplating a layer of copper and then plating a layer of nickel over the copper. These layers have thicknesses in the order of tenths of thousandths of an inch. The time required to deposit the two layers is substantial and, although the soldering step can be carried out by conventional methods, stresses built up in the two layers themselves in service may ultimately result in loss of adhesion and ultimately interfacial corrosion taking place.

It has also been proposed to utilize a coating of nickel on which a thin coating of gold is electrodeposited. The use of gold plating greatly increases the cost of the operation and in this system also, there may be separation of the electroplated coatings in service. Various soldering methods are described in an article entitled "The Repair of Aluminum Heat Exchangers" by R. A. Morley and T. L. Wilkinson, appearing in the October 1978 issue of *Welding Journal*. Aluminum soldering techniques in general are also described in *Aluminum Soldering Handbook*, Third edition, 1976, published by the Aluminum Association, Inc., New York, N.Y.

BRIEF SUMMARY OF THE INVENTION

A general object of the invention is the provision of an improved method of soldering aluminum with the use of low temperature solders and soldering techniques.

Another object is the provision of such a method that can be carried out rapidly and economically without requiring techniques that involve unusual skills.

Another object is the provision of such a method that will provide soldered joints and connections that will remain free from interfacial corrosion over long periods of time and in which the solder is effectively bonded to the aluminum.

Another object is the provision of a tool that is particularly adapted to carry out the electrolytic cleaning and plating steps that are required prior to the soldering operation.

Briefly, according to the present invention, the above and other objects of the invention are attained by first subjecting the area of the aluminum to which solder is required to adhere to electrolytic cleaning and etching steps, followed by the electroplating of a very thin coating of nickel on the area to be soldered, the cleaning, etching, and plating steps preferably being carried out by means of a brush plating process. A brush plating nickel solution is also preferably employed, a suitable solution being hereinafter set forth.

The nickel is deposited on the area to be soldered by known brush plating techniques; the nickel coating is very thin, having a thickness of from about 0.000030 to about 0.000050 inch. Because of the thinness of the coating, the plating operation can be carried out in a very short period of time. Also, the thin coating provides excellent adhesion of the nickel to the aluminum and is free from the stresses that may occur when coatings of conventional thickness or coatings comprising several layers are employed. The thin coating, however, provides ample protection against oxidation of the underlying aluminum during the period of time that elapses between the completion of the plating step and the completion of the soldering operation, and also, as described in greater detail below, the thin coating gives unexpectedly good protection against interfacial corrosion in subsequent use of the soldered product. The cleaning and etching steps remove the usual oxide film from the aluminum without requiring the use of chemicals that are difficult to remove and which may cause corrosion problems later. Instead, by my process, the cleaning and etching materials can be washed away readily and the oxide film is replaced with a very thin layer of nickel which is atomically bonded to the aluminum. The result is that the use of special aluminum soldering fluxes, which can ultimately result in interfacial corrosion, is eliminated. Instead, by the present invention, the usual oxide film is removed and replaced by a very thin, atomically bonded layer of nickel without doing damage to the aluminum or the joint and without subsequent interfacial corrosion taking place.

The soldering operation can be carried out with conventional low melting solders by conventional means, using known conventional fluxes.

Because of the extreme thinness of the nickel layer, it is difficult to determine with certainty why these advantageous results, which involve simplified and highly economical procedures, are obtained. However, it seems likely that the solder alloys with the nickel, the solder penetrating the nickel layer and providing a solder-rich alloy at the surface of the nickel away from the aluminum, which becomes progressively nickel-rich as the interface between the nickel and the aluminum is approached. In any event, the presence of the nickel in the solder-nickel alloy apparently prevents interfacial corrosion from taking place between the solder and the aluminum, and thus long-lived and reliable solder joints can be made at reasonable cost and can be produced without difficulty by operators who are accustomed to performing soldering operations on copper and brass radiators.

The cleaning and etching operations, and the electroplating operation, are preferably carried out by means of an improved type of brush plating tools embodying a platinum-coated titanium electrode covered by an absorbent polyester felt which is dipped in the electrolyte.

According to the present invention, the same type of tool is employed to deposit a very thin layer of nickel on the cleaned and etched aluminum surface, a thickness of from 0.000030 to 0.000050 of an inch being preferred. A coating of such thinness is advantageous not only because it can be deposited very rapidly and economically, but also because the coating, even though very thin, is thick enough and dense enough to prevent the formation of an oxide film on the surface of the aluminum during reasonable storage times after plating. Also, as mentioned above, the coating is so thin that the solder apparently is alloyed with the nickel throughout the entire thickness of the nickel, the solder-nickel alloy being securely bonded to the underlying aluminum and the presence of the nickel in the alloy preventing interfacial corrosion from taking place. This is more economical than and superior to previous systems in which two or more electrodeposited layers on the aluminum were employed and the mechanical effectiveness of the soldered joint was entirely due to the adhesion of the first electroplated layer to the aluminum. Thus, the invention unexpectedly provides a more economical method and a superior result by using fewer steps than had heretofore been considered necessary.

DESCRIPTION OF A PREFERRED EMBODIMENT

As stated above, according to the present invention, aluminum can be effectively and economically soldered by the use of conventional low temperature solders by electrolytically cleaning and etching and then electroplating the aluminum surfaces to be soldered with a very thin coating of nickel, preferably between 0.000030 and 0.000050 inch in thickness. The production of the coating of nickel involves preliminary treatment of the aluminum surface to obtain good adhesion of the nickel to the underlying aluminum.

The surface to be soldered is, if necessary, subjected to a preliminary cleaning by conventional means, such as by washing in a hot solution of a detergent in water, for example, a hot alkaline bath composed of water and trisodium phosphate or, if necessary, by vapor degreasing. These cleaning steps are preferably followed by glass bead blasting. Treatments of this type remove surface dirt, but the normal oxide film which always forms on aluminum surfaces exposed to air must be substantially removed before the electroplating operation is performed.

Figure 1:
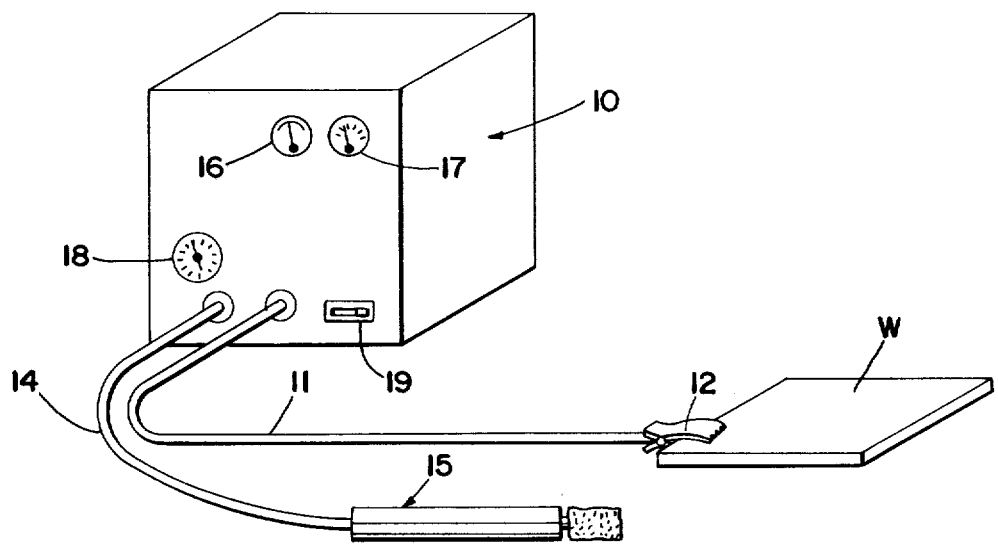
FIG. 1 somewhat diagrammatically illustrates a preferred apparatus for carrying out the cleaning, etching, and plating steps preparatory to soldering in accordance with the invention.

According to the present invention, the aluminum surface, which is substantially free from surface dirt, is prepared to receive the nickel plating by first performing an electrolytic cleaning step in which the aluminum is made the cathode and the anode is constituted by a platinum-coated titanium wire covered by a nonconductive absorbent material, such as a polyester felt, that is resistant to attack by the cleaning solution. A suitable apparatus, as shown somewhat diagrammatically in FIG. 1, may comprise a power source 10 that is adapted to supply direct current that may be varied from, for example, 0 volts to 15 volts. The power source may be energized from any suitable supply, such as an AC supply (not shown). One output terminal of the power source may be connected to the workpiece W, as by a conductor 11 and clip 12, and the other output of the power source may be connected by a conductor 14 to a brush plating tool 15, which preferably is constructed as illustrated in FIGS. 2 to 5. The power source is provided with controls so that the voltage can be maintained at a desired level and the current density adjusted to a desired value. Conventional meters 16 and 17 are employed to indicate the output voltage and current, and the apparatus embodies a conventional voltage control 18 and a polarity reversing switch 19 so that the tool can be made either the anode or the cathode in an electrolytic circuit.

Figure 2:
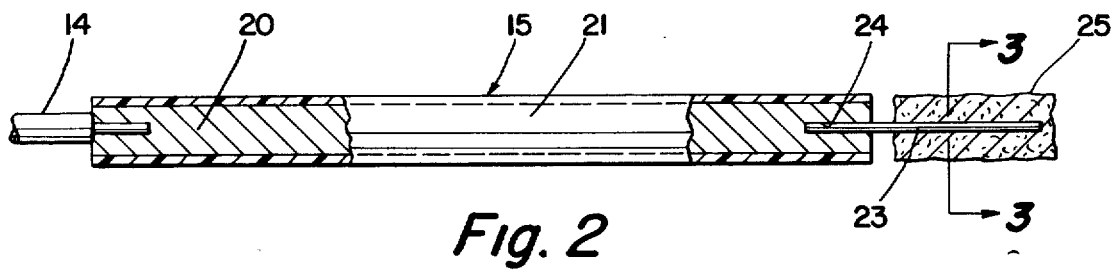
FIG. 2 is a side elevation, partially in section, of a preferred tool for carrying out the electrolytic cleaning, etching, and plating steps of the preferred method.
Figures 3, 4, 5:
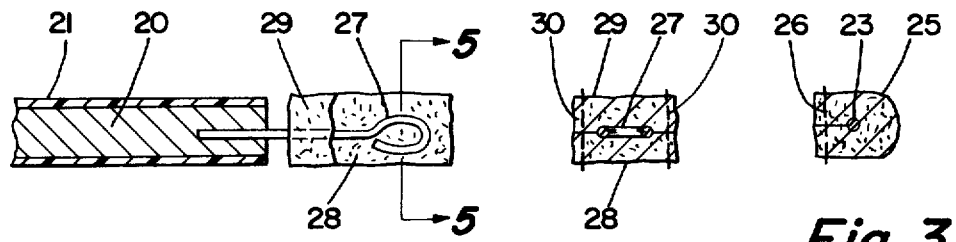
FIG. 3 is a cross section taken on line 3—3 of FIG. 2.
FIG. 4 is a fragmentary, longitudinal cross section showing a modified form of tool.
FIG. 5 is a cross section taken on line 5—5 of FIG. 4, but rotated 90° from the orientation of FIG. 4.

The tool 15 illustrated in FIGS. 2 and 3 is designed particularly for use on small surfaces and in crowded spaces such as encountered in making repairs to radiators and heat exchangers used in automotive vehicles. The tool preferably comprises an aluminum rod 20 having an insulating cover, such as a vinyl sleeve 21, so that the covered rod constitutes a handle for the tool. The lead 14 from the power supply is connected to one end of the rod by any convenient connector. At the other end of the rod, a platinum-coated titanium wire 23 having, in the present embodiment, a diameter of about 0.090 inch is secured by a press fit in a hole 24 drilled in the rod 20. The exposed end of the wire is enclosed in a piece of absorbent polyester felt 25. If thin felt, one-eighth inch in thickness or less, is employed, it may be wrapped around the wire and stitched in place as shown at 26 in FIG. 3. If thicker felt of, for example, a thickness of one-quarter inch is employed, the wire may be simply inserted into the felt, the outer surface of the felt being rounded to a desired contour. For larger surfaces, the wire may be bent into a loop as shown at 27 in FIG. 4 and pieces of felt 28 and 29 disposed on opposite sides of the loop and stitched together by stitches 30 to retain them in place.

In use, the felt of the tool may be dipped into a small receptacle containing the electrolyte that is to be used, the first electrolyte used in the process being the cleaning electrolyte specified above. The power supply is turned on to provide a voltage appropriate to the solution employed, and the surface is then rubbed vigorously with the saturated felt for a short period of time. The time varies depending upon the area to be cleaned, but where the area is small, for example about two or three times the projected area of the felt, the cleaning operation can be accomplished in ten to twenty seconds of fairly vigorous rubbing.

In this operation, the workpiece is made the cathode in the electrolytic circuit and the tool is the anode. In a typical example, the cleaning solution is an alkaline electrolyte, a water solution containing 50 grams of sodium hydroxide (NaOH), 20 grams citric acid ($C_6H_8O_7$) and 15 grams of soda ash ($Na_2CO_3$) per liter of the final solution. The pH is from about 12 to 15.5 and the specific gravity from about 1.050 to 1.070. The applied voltage may be about 9 volts, and the cleaning operation is continued with fairly vigorous rubbing of the area to be soldered for a period of approximately ten seconds.

Following the electrolytic cleaning operation, the surface is rinsed with water and then subjected to an electrolytic etching operation. This is also carried out with a tool of the same type, as shown in FIGS. 2 to 5, but a different tool from the one employed for the electrolytic cleaning step is used in order to avoid intermixing of the solutions. A conventional etching solution consisting essentially of hydrochloric acid containing about 100 milliliters of HCl per liter having a pH of from 0 to 1 and a specific gravity of from 1.010 to 1.020 may be employed. The workpiece is made the anode and the tool the cathode in the electrolytic circuit. The tool is dipped in the etching solution, the current turned on, and the area to be soldered is rubbed fairly vigorously by the saturated felt of the tool for a period of about ten seconds at a voltage of about 8 volts. The electroltyic etching is then discontinued, the surface again rinsed with water, and the previously treated surface subjected to a nickel plating operation.

The plating is preferably accomplished by the use of another tool of the type shown in FIGS. 2 to 5. In this case, the workpiece is made the cathode in the electrolytic circuit and the tool is the anode. A conventional electrolyte utilized for brush-plating or nickel may be employed, a preferred electrolyte consisting of a water solution containing the following, expressed in grams per liter final solution:

| | |
|---|---|
| Nickel sulfate ($NiSO_4 \cdot 6H_2O$) | 410 grams |
| Citric Acid ($C_6H_8O_7$) | 40 grams |
| Nickel Formate ($Ni(CHO_2)_2 \cdot 2H_2O$) | 25 grams |
| Sodium Chloride (NaCL) | 10 grams |
| pH | about 1.5 to 2.5 |
| Specific gravity | about 1.26 to 1.28 |

The controls of the power supply are set so that the voltage is approximately 9 volts and the current density is preferably about 300 amperes per square foot of effective area of the tool. Under these conditions, a nickel deposit of the desired thickness of from 0.000030 to 0.000050 inch is produced in about 60 seconds by vigorously rubbing the area to be plated with the electrolyte-saturated felt surface of the tool. The plated surface is then rinsed with water and the area is ready for soldering. All aluminum surfaces that are to be soldered are similarly prepared. Conventional soft solders with conventional non-corrosive fluxes, such as Rosin and Rosin-Alcohol fluxes, may be employed. A satisfactory flux is marketed under the name "NOKORODE" by the M. W. Dunton Company, of Providence, R.I. Solders having a melting temperature of about 420° F. are preferred. A conventional heat source, such as a torch or soldering iron, may be employed. The techniques are also conventional so that an operator who is accustomed to soldering copper and brass products such as radiators and heat exchangers can employ the same techniques in soldering aluminum surfaces that have been provided with a very thin nickel coating as described above. Conventional lead-tin soft solders are preferred. Solders composed of 10% to 50% lead and 30% to 50% tin and having melting points within the range of from about 350° to 510° F. are satisfactory for most purposes.

It is to be noted that some commercially available proprietary electrolytic cleaning, etching, and plating solutions can be used in place of those given above with satisfactory results; for example, "Dalic" cleaning and deoxidizing solution, Code 1010, "Dalic" #2 etch, Code 1022, and "Dalic" nickel plating electrolyte, Code 2080, marketed by Sifco Metachemical Division of Sifco Industries, Inc., of Cleveland, Ohio, may be used in place of the cleaning, etching, and nickel plating solutions, respectively, set forth above.

The thickness of the electrodeposited nickel layer is of great importance to the success of the method. Coatings within the preferred range of from 0.000030 to 0.000050 inch in thickness are thick enough to protect the underlying aluminum surface from oxidation during the time that elapses between the plating operation and the soldering operation. In most shops, this is only a matter of minutes or hours, but unless conditions are unduly severe, successful results can be obtained with the present invention even though a period of three or four days may elapse between the final nickel plating operation and the soldering. If the plated surface has been subjected to dirty conditions, a simple cleaning operation with a hot detergent solution, as described above, usually will be sufficient to restore the surface to a condition where soldering can be carried out successfully.

While the nickel coating according to the present invention is very thin in comparison with the layers of plated metals ordinarily employed in preparing aluminum for soldering, it is nevertheless thick enough to prevent formation of oxide films on the aluminum of sufficient thickness to interfere with a subsequent soldering operation even though the soldering operation does not take place immediately after the conclusion of the nickel plating step. The nickel coating also makes possible the use of non-corrosive fluxes in the soldering operation. These fluxes leave no damaging or corrosive residue that might cause corrosion to take place.

As mentioned above, however, while the nickel coating is thick enough to prevent the underlying aluminum from oxidation, the layer is so thin that it appears that during the soldering operation an alloy of nickel and solder is formed that extends to the underlying aluminum surface. In the interface adjacent the aluminum surface, the alloy is nickel-rich and the percentage of nickel is reduced as the distance from the aluminum surface increases, the alloy being solder-rich in the zones remote from the aluminum. The presence of the alloy assures proper bonding of the solder to the aluminum and interfacial corrosion is prevented, probably by the presence of the nickel in the nickel solder alloy that is adjacent the aluminum. The thinness of the nickel coating also appears to contribute to the permanence and the strength of the bond between the solder and the aluminum, as compared to prior methods where two or more electrocoated metals were deposited on the aluminum, usually in thicker layers than those preferred herein.

It is also to be noted that the method and the preferred tool provide substantial economies in operation as compared to prior methods. These economies result from the fact that the cleaning, etching, and plating operations can be carried out rapidly and economically. One factor contributing to the economy of operation is the fact that only one very thin electroplated layer of nickel is employed, as distinguished from multiple layers previously employed, and which layers frequently included gold as one of the layers. Further economy results from the fact that operators who have the ability to solder copper-brass radiators and the like are not required to learn any difficult, new techniques or procedures in carrying out the present invention.

Those skilled in the art will appreciate that various changes and modifications in the preferred form of the invention disclosed herein may be made without departing from the spirit and scope of the invention. The subject matter of the invention is defined in the appended claims.

What is claimed is:

1. A method of soldering aluminum with soft solder which includes the steps of removing surface soil from the aluminum surfaces to be soldered, subjecting the surfaces to be soldered to an electrocleaning operation by making the surface the cathode in an electrolytic circuit embodying an alkaline electrolyte, electroetching the electrocleaned surface by making the surface the anode in an electrolytic circuit embodying an acid electrolyte and brush electroplating a layer of nickel having a thickness of from about 0.000030 inch to about 0.000050 inch on the previously cleaned and etched aluminum surfaces and thereafter soldering the surfaces by applying a soft solder and a non-corrosive flux thereto, and heating the solder sufficiently to fuse the same on the nickel-plated surfaces.

2. A method according to claim 1, wherein the alkaline electrolyte comprises a water solution of sodium hydroxide.

3. A method according to claim 1 or claim 2, wherein the acid electrolyte comprises a solution of hydrochloric acid.

4. A method according to claim 1 or claim 2, wherein the flux comprises rosin.

5. A method according to claim 1 or claim 2, wherein the brush plating is carried out with an electrolyte comprising a solution containing nickel sulfate, citric acid, and nickel formate.

6. A method according to claim 1 or claim 2, wherein the solder contains from about 30% to about 50% tin and from about 70% to about 50% lead.

7. A method according to claim 1 or claim 2, wherein the nickel is deposited on the surface by means of a brush-plating operation employing a tool as an anode in the electrolytic circuit, the anode tool having a surface comprising an absorbent layer of felt saturated with the plating electrolyte, the workpiece to be plated constituting the cathode in the electrolytic circuit.

8. A method according to claim 1 or claim 2, wherein the electroplating is carried out at about 9 volts.

9. A method of soldering aluminum with soft solder which includes the steps of removing surface soil from each aluminum surface to be soldered, subjecting the surface to be soldered to an electrocleaning operation by making the surface the cathode in an electrolytic circuit embodying an alkaline electrolyte and rubbing the surface by a non-conducting absorbent member saturated with the electrolyte during the electrolytic cleaning operation, electroetching the electrocleaned surface by making the surface the anode in an electrolytic circuit embodying an acid electrolyte and rubbing the surface being etched with a non-conducting absorbent member saturated with the acid electrolyte during the electroetching operation, brush electroplating a layer, consisting essentially of nickel and having a thickness of from about 0.000030 to about 0.000050 inch, on the previously cleaned and etched aluminum surface, the surface being rubbed by a non-conducting absorbent member saturated with a nickel plating electrolyte during the plating operation, the nickel layer being sufficiently thick to prevent the formation of an oxide film on the aluminum surface for a period of at least several hours, and thereafter soldering the surface by applying a soft solder and a non-corrosive flux to the nickel plated surface and heating the solder sufficiently to fuse the same to the nickel plated surface of the underlying aluminum, the soldering operation producing an alloy of nickel and solder that extends substantially to the underlying surface of the aluminum, the percentage of nickel in the alloy layer being greater in the portions thereof near the aluminum surface than in the portions thereof at greater distances from the aluminum surface, the alloy layer inhibiting the occurrence of interfacial corrosion in soldered joints produced by the method.

* * * * *